United States Patent
Iizuka

(10) Patent No.: US 12,473,390 B2
(45) Date of Patent: Nov. 18, 2025

(54) HYDROGEL SHEET

(71) Applicant: SEKISUI KASEI CO., LTD., Osaka (JP)

(72) Inventor: Ryo Iizuka, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 681 days.

(21) Appl. No.: 17/110,613

(22) Filed: Dec. 3, 2020

(65) Prior Publication Data

US 2021/0198403 A1 Jul. 1, 2021

(30) Foreign Application Priority Data

Dec. 26, 2019 (JP) .................................. 2019-235843

(51) Int. Cl.
*A61B 5/25* (2021.01)
*A61N 1/04* (2006.01)
*C08F 220/56* (2006.01)

(52) U.S. Cl.
CPC .............. *C08F 220/56* (2013.01); *A61B 5/25* (2021.01); *A61N 1/0456* (2013.01); *A61B 2562/0209* (2013.01); *C08J 2333/26* (2013.01)

(58) Field of Classification Search
CPC . C08F 220/56; A61B 5/25; A61B 2562/0209; A61B 5/259; A61N 1/0456; C08J 2333/26

See application file for complete search history.

(56) References Cited

U.S. PATENT DOCUMENTS

2004/0087671 A1* 5/2004 Tamada ................... C08J 3/075 516/99
2013/0338472 A1* 12/2013 Macia Barber .... A61B 5/02055 174/255

FOREIGN PATENT DOCUMENTS

EP  3520692 A1 * 8/2019 ........... A61B 5/6833
WO  2012/124216  9/2012
(Continued)

OTHER PUBLICATIONS

Amadutsumi K, Translation of WO 2019077799-A1, "Garment of Conductive Composite Thread, and Disposable Garment", Apr. 25, 2019, Retreived on Aug. 10, 2023 (Year: 2019).*

(Continued)

*Primary Examiner* — Adam Z Minchella
(74) *Attorney, Agent, or Firm* — GREENBLUM & BERNSTEIN, P.L.C.

(57) ABSTRACT

A hydrogel sheet includes a hydrogel, and a plurality of intermediate substrates placed in the hydrogel. The plurality of intermediate substrates includes first and second intermediate substrates. The first intermediate substrate has a stretch rate of 20% to 90% measured by the following measurement method. An intermediate substrate having a 20-mm width and a 100-mm length is clamped at 70-mm intervals in the length direction. Then, the intermediate substrate is stretched in the length direction at a stretch rate of 100 mm/min, and the length L (mm) of the intermediate substrate between the clamps when the maximum load was applied is measured. The stretch rate (%) is calculated as [(L-70)/70]*100. The second intermediate substrate satisfies either (i) the stretch rate is 100% to 200%; or (ii) the stretch rate is 20% to 90% and the maximum load at the time of being fractured is 5N to 15N.

15 Claims, 1 Drawing Sheet

(56) References Cited

FOREIGN PATENT DOCUMENTS

| WO | WO-2018062029 A1 | * | 4/2018 | ........... | A61B 5/0408 |
| WO | WO-2019077799 A1 | * | 4/2019 | ............. | A61B 5/332 |

OTHER PUBLICATIONS

Kato Kazuki, Iizuka Ryo, Translation of WO-2018062029-A1, "Gel Sheet", Apr. 5, 2018, Retrieved on Aug. 10, 2023 (Year: 2018).*

Translation of WO-2019077799-A1 (Year: 2019).*

* cited by examiner

HYDROGEL SHEET

FIELD OF THE INVENTION

This invention relates to a hydrogel sheet.

BACKGROUND OF THE INVENTION

Because they have electrical conductivity and adhesiveness, hydrogels have conventionally been used for medical electrodes (TENS, ECG, counterelectrode plates, and the like). These electrodes comprise conductive materials such as metal. Aluminum, tin, carbon, and Ag/AgCl (silver/silver chloride) are used for these conductive materials. An increasing number of rubber electrodes blended with conductive materials such as carbon have also been used recently. The reason therefor is durability of the electrodes. These electrodes contact a skin surface via a hydrogel containing an electrolyte.

Hydrogels generally comprise an intermediate substrate such a woven fabric or a nonwoven fabric from the point of imparting strength to the hydrogel, or shape retention of the hydrogel (Patent Literature 1). When the amount of grammage of the intermediate substrate is increased for shape retention improvement, the rigidity of the entire hydrogel becomes high. However, the followability of the hydrogel to an object to which the hydrogel is attached, particularly the followability of the hydrogel to a bent surface such as an elbow, a knee, or the like, is impaired. Permeability of a liquid to the hydrogel during the manufacturing of the hydrogel also becomes poor, which may lead to poor appearance of the hydrogel.

While woven fabrics have followability due to their stretchability, they are sometimes poor in shape retention. For example, when the hydrogel is released from an object, there is a possibility that the hydrogel will be stretched, and that the shape thereof will be lost. Accordingly, the handleability of the hydrogel will be deteriorated.

PATENT LITERATURE

[Patent Literature 1: WO2012/124216A1

SUMMARY OF THE INVENTION

The problem to be solved by the invention is to provide a hydrogel sheet that has excellent followability to an object, and that is excellent in handleability.

The inventors found that the above problem can be solved by embedding a plurality of intermediate substrates having a certain degree of stretch rate into a hydrogel.

In one embodiment of the invention, a hydrogel sheet comprising a hydrogel and a plurality of intermediate substrates placed in the hydrogel is provided. The plurality of intermediate substrates includes a first intermediate substrate and a second intermediate substrate. The first intermediate substrate has a stretch rate of 20% to 90% measured by the following measurement method:

Measurement method: An intermediate substrate having a 20-mm width and a 100-mm length is clamped at 70-mm intervals in the length direction, the intermediate substrate is stretched in the length direction at a stretch rate of 100 mm/min, and the length L (mm) of the intermediate substrate between the clamps when the maximum load was applied is measured. The stretch rate (%) is calculated as $[(L-70)/70]*100$.

The second intermediate substrate satisfies either (i) the stretch rate is 100% to 200%; or (ii) the stretch rate is 20% to 90% and the maximum load at the time of being fractured is 5N to 15N.

DETAILED DESCRIPTION OF THE INVENTION

Figure 1:
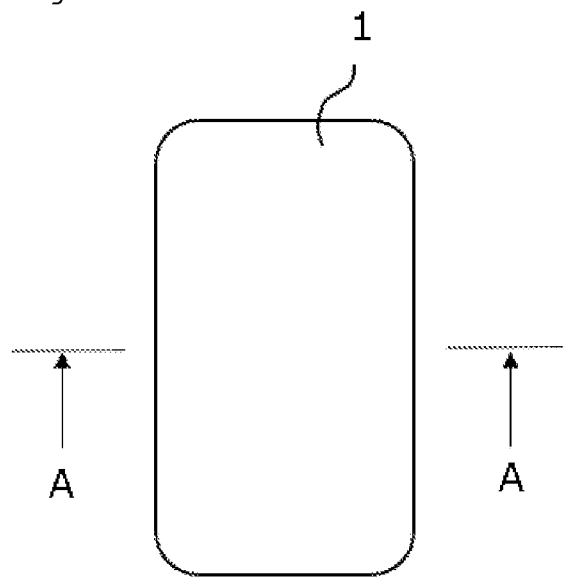
FIG. 1 is a schematic plan view of an embodiment of a hydrogel sheet.

Embodiments of a hydrogel sheet according to the invention will be described below.

A hydrogel sheet of an embodiment of the present invention is a hydrogel sheet comprising a hydrogel, and a plurality of intermediate substrates placed in the hydrogel. The plurality of intermediate substrates includes a first intermediate substrate and a second substrate.

The first intermediate substrate has a stretch rate of 20% to 90% measured by the following measurement method:

Measurement method: An intermediate substrate of a 20-mm width and a 100-mm length is clamped at 70-mm intervals in the length direction. Then, the intermediate substrate is stretched in the length direction at a stretch rate of 100 mm/min, and the length L (mm) of the intermediate substrate between the clamps when the maximum load was applied is measured. The stretch rate (%) is calculated as $[(L-70)/70]*100$.

The stretch rate of the first intermediate substrate and that of the second intermediate substrate are measured in accordance with the measurement method described above.

Hydrogel

The hydrogel (also referred to as a "gel" hereinafter) that constitutes a hydrogel sheet comprises a polymer matrix, water, and polyhydric alcohol. The polymer matrix is formed from a copolymer of an acrylic monomer and a crosslinkable monomer Acrylic monomer is a collective term for a monomer that includes an acryloyl group ($H_2C=CH-C(=O-)$) or a methacryloyl group ($H_2C=C(CH_3)-C(=O)-$), and that is capable of forming a polymer by polymerization. Acrylic monomers are monofunctional, non-crosslinkable monomers that include one polymerizable carbon-to-carbon (C—C) double bond in the molecule.

The acrylic monomer is not particularly limited, but is preferably at least one monofunctional monomer selected from the group consisting of (meth)acrylamide monomer and (meth)acrylic ester. (Meth)acrylamide monomer is more preferable.

Examples of the acrylamide monomer include (meth)acrylamide; N,N-dialkyl(meth)acrylamide such as N,N-dimethyl(meth)acrylamide and N,N-diethyl(meth)acrylamide; N-alkyl(meth)acrylamide such as N-isopropyl(meth)acrylamide, N-methyl(meth)acrylamide, N-ethyl(meth)acrylamide and N-propyl(meth)acrylamide; N-hydroxyalkyl(meth) acrylamide such as N-hydroxyethyl(meth)acrylamide and N-hydroxymethyl(meth)acrylamide; N-alkoxy alkyl(meth)acrylamide such as N-ethoxy methyl(meth)acrylamide, N-propoxy methyl(meth)acrylamide, N-butoxy methyl(meth)acrylamide, N-isobutoxy methyl(meth)acrylamide, N-pentoxy methyl(meth)acrylamide, N-hexyloxy methyl(meth)acrylamide, N-heptoxy methyl(meth)acrylamide, N-octoxy methyl(meth)acrylamide, N-ethoxy ethyl(meth)

acrylamide, N-propoxy ethyl(meth)acrylamide, and N-butoxy ethyl(meth)acrylamide; a cationic acrylamide compound including an amino group such as dimethylaminopropyl(meth)acrylamide; an anionic acrylic monomer including a sulfonic group such as 4-acryloyl morpholine and tert-butyl acrylamide sulfonic acid or a salt thereof; and derivatives of these compounds.

Among these, one or more acrylamide monomers selected from the group consisting of (meth)acrylamide, N, N-dimethyl(meth)acrylamide, N,N-diethyl(meth)acrylamide, N-isopropyl(meth)acrylamide, N-methyl(meth)acrylamide, N-ethyl(meth)acrylamide, N-propyl(meth)acrylamide, N-hydroxyethyl(meth)acrylamide, N-hydroxymethyl(meth)acrylamide, dimethylaminopropyl(meth)acrylamide, 4-acryloyl morpholine, tert-butyl acrylamide sulfonic acid and a salt thereof are preferred; however, the acrylamide monomer is not limited thereto.

Examples of the (meth)acrylic ester include, but are not limited to, one or more compounds selected from the group consisting of (meth)acrylic alkyl ester having a carbon number of 1 to 18, such as methyl(meth)acrylate, ethyl (meth)acrylate, n-propyl(meth)acrylate, isopropyl(meth)acrylate, n-butyl(meth)acrylate, isobutyl (meth)acrylate, tert-butyl(meth)acrylate, n-hexyl(meth)acrylate, n-octyl (meth)acrylate, isooctyl(meth)acrylate, 2-ethylhexyl (meth) acrylate, n-nonyl(meth)acrylate, isononyl(meth)acrylate, n-pentyl(meth)acrylate, n-decyl(meth)acrylate, isodecyl (meth)acrylate, n-lauryl(meth)acrylate, tridecyl(meth)acrylate and n-stearyl(meth)acrylate; alicyclic(meth)acrylic acid ester such as (meth)acrylic acid cyclohexyl, (meth)acrylic acid isobornyl and (meth)acrylic acid 1-adamanthyl; an alkoxy-containing (meth)acrylic acid ester such as (meth)acrylic acid 2-methoxy ethyl, (meth)acrylic acid ethoxy ethyl and (meth)acrylic acid methoxy triethylene glycol; (meth)acrylic acid hydroxyalkyl(an aryl group may be bound to the hydroxyalkyl group via an ether bond) such as (meth)acrylic acid 2-hydroxyethyl, (meth)acrylic acid 2-hydroxypropyl, (meth)acrylic acid 2-hydroxy-3-phenoxy propyl and (meth)acrylic acid 2-hydroxybutyl; mono-(meth)acrylic acid glycerin; mono(meth)acrylic acid polyalkylene glycol such as mono(meth)acrylic acid polyethylene glycol, and a copolymer of polyethylene glycols and polyethylene glycols; (meth)acrylic ester having an aromatic ring such as (meth)acrylic acid benzyl; and (meth)acrylic acid ester having a heterocyclic ring, such as (meth)acrylic acid tetrahydrofurfuryl.

The hydrogel may further comprise acrylic acid as an acrylic monomer. Alternatively, the hydrogel may not comprise acrylic acid. By containing an appropriate amount of acrylic acid in the hydrogel, adhesive force as that of conventional hydrogels can be maintained, and the hardness of the hydrogel can be increased.

However, the inclusion of acrylic acid causes a bad smell in the hydrogel. Thus, a smaller amount of acrylic acid is preferred. For example, the amount of acrylic acid is preferably 15 mass % or less with respect to the hydrogel, more preferably 1 mass % or less with respect to the hydrogel. Even more preferably, no acrylic acid is added to the hydrogel.

The addition amount of the acrylic monomer with respect to the total amount of monomers constituting the polymer matrix is preferably in the range of 98.5 mass % to 99.98 mass %, and more preferably in the range of 98.5 mass % to 99.9 mass % in terms of constituents of the hydrogel, and shape retention and handleability of the hydrogel. Similarly, the content of the structural unit derived from the acrylic monomer with respect to a total amount of the polymer matrix is preferably in the range of 98.5 mass % to 99.98 mass %, and more preferably in the range of 98.5 mass % to 99.9 mass %.

The crosslinkable monomer is preferably a monomer including at least two polymerizable carbon-to-carbon (C—C) double bonds in the molecule. Specifically, the crosslinkable monomer includes multifunctional (meth)acrylamide or multifunctional (meth)acrylic acid ester such as methylene bis(meth)acrylamide, ethylene bis(meth)acrylamide, ethylene(poly)glycol di(meth)acrylate, propylene(poly)glycol di(meth)acrylate, glycerin di(meth)acrylate and glycerin tri(meth)acrylate; tetraaryloxyethane; and diarylammonium chloride. These compounds can be used alone, or in combination.

As such a crosslinkable monomer including at least two polymerizable carbon-to-carbon (C—C) double bonds in the molecule, the polyglycerine derivative described in Japanese Patent No. 2803886 can also be used. This compound is a multifunctional compound having two or more (meth)acryloyl groups or vinyl groups, and having a molecular weight of 400 or more.

The addition amount of the crosslinkable monomer is preferably in the range of 0.02 mass % to 1.5 mass % with respect to a total mass monomers constituting of the polymer matrix, from the points of adhesive force, shape retention, and handleability of the hydrogel. When the addition amount of the crosslinkable monomer is 0.02 mass % or more, the crosslinking density is maintained, and the shape stability is sufficient. At the same time, the cohesive force of the gel can improve, and adhesive force can be made sufficiently high. Further, at the time of releasing the gel sheet from an object, the gel sheet can be released smoothly from the object, the gel is hard to tear, and handleability of the gel sheet is excellent. When the addition amount of the crosslinkable monomer is 1.5 mass % or less, the adhesive force of the gel can be maintained at a high level, and a flexible gel can be made.

Similarly, the content of the structure unit derived from the crosslinkable monomer with respect to the total mass of the polymer matrix is preferably in the range of 0.02 mass % to 1.5 mass %.

Further, the addition amount of the crosslinkable monomer is preferably 0.02 mass % to 0.1 mass %, more preferably 0.03 mass % to 0.05 mass % with respect to the hydrogel, from the points of adhesive force and handleability of the gel sheet. Similarly, the content of the structural unit derived from the crosslinkable monomer in the hydrogel is preferably 0.02 mass % to 0.1 mass %, more preferably 0.03 mass % to 0.05 mass %.

From the points of shape retention and handleability of the hydrogel, as constituent monomers of the polymer matrix, it is preferred that the addition amount of the acrylic monomer is 98.5 mass % to 99.98 mass % and the addition amount of the crosslinkable monomer is 0.02 mass % to 1.5 mass %, with respect to the total amount of monomers constituting the polymer matrix. It is more preferred that the addition amount of the acrylic monomer is 99.5 mass % to 99.97 mass % and the addition amount of the crosslinkable monomer is 0.03 mass % to 0.5 mass %, with respect to a total amount of monomers constituting the polymer matrix.

From the points of shape retention and handleability of the hydrogel, it is preferred that the content of the acrylic monomer is 98.5 mass % to 99.98 mass % and the content of the crosslinkable monomer is 0.02 mass % to 1.5 mass % in the total amount of monomers constituting the polymer matrix or in the polymer matrix. It is more preferred that the content of the acrylic monomer is 99.5 mass % to 99.97 mass % and the content of the crosslinkable monomer is 0.03 mass % to 0.5 mass %, with respect to the total amount of monomers constituting the polymer matrix or with respect to the polymer matrix.

It is preferred that the copolymer of the acrylic monomer and the crosslinkable monomer does not include an additional monomer that constitutes the copolymer, other than the acrylic monomer and the crosslinkable monomer. However, the copolymer may include such an additional monomer.

The content of water in the hydrogel is not particularly limited, but is preferably in the range of 10 mass % to 60 mass %, more preferably 10 mass % to 45 mass %, more preferably 15 mass % to 30 mass %. When the water content is overly low, the water content relative to the equilibrium water content of the hydrogel is low. Thus, the hygroscopicity of the hydrogel may become strong, and the hydrogel may deteriorate (for example, swell) over time. When the water content is overly high, the water content relative to the equilibrium water content of the hydrogel is high. Then, shrinkage of the hydrogel due to dryness and changes in the physical properties of the hydrogel may arise.

Polyhydric alcohol is added in order to impart wettability to the hydrogel. Examples of polyhydric alcohols include, but are not limited to, diols such as ethylene glycol, triethylene glycol, 1,6-hexane diol, 1,9-nonane diol, propylene glycol and butane diol; trivalent or higher valent polyhydric alcohols such as glycerin, pentaerythritol, and sorbitol; condensated forms of polyhydric alcohols, such as polyethylene glycol, polypropylene glycol and polyglycerin; and denatured forms of polyhydric alcohols, such as polyoxyethylene glycerin.

Among the polyhydric alcohols, polyhydric alcohols that are liquid in the temperature range in which the hydrogel is used (for example, approximately 20° C. when the hydrogel is used indoors) are preferably used. Specifically, one or more polyhydric alcohols selected from the group consisting of ethylene glycol, triethylene glycol, propylene glycol, polypropylene glycol, polyglycerin, and glycerin are preferred.

The content of the polyhydric alcohol in the hydrogel is not particularly limited, but is preferably in the range of 20 mass % to 70 mass %, more preferably in the range of 25 mass % to 65 mass % with respect to the hydrogel. The content of the polyhydric alcohol is preferably higher than the content of water; however, it may be the same or lower than the content of water. When the content of the polyhydric alcohol is overly low, the moisture retainability and elasticity of the resultant hydrogel become poor. Then, evaporation of water from the hydrogel becomes remarkable, stability of the hydrogel over time is lost, flexibility of the hydrogel is impaired, and adhesive property becomes insufficient. When the content of the polyhydric alcohol is overly high, it exceeds the limit amount of the polyhydric alcohol that the polymer matrix can hold. Then, the physical properties of the hydrogel will change due to bleeding of the polyhydric alcohol out of the surface of the hydrogel, resulting in insufficient adhesive property of the hydrogel. Accordingly, the content of the polyhydric alcohol is appropriately determined depending on these balances.

The hydrogel may optionally include an electrolyte as required, thereby impairing electrical conductivity to the hydrogel.

Examples of the electrolyte include, but are not limited to, alkali metal halides such as sodium halide, lithium halide and potassium halide; alkaline earth metal halides such as magnesium halide and calcium halide; and other metal halides. As the electrodes, hypochlorites, chlorites, chlorates, perchlorates, hydrochlorides, sulfates, carbonates, nitrates, and phosphates of the above metal can be preferably used. As the electrodes, inorganic salts such as ammonium salts and complex salts; monovalent organic carboxylic acid salts such as acetic acid, benzoic acid, and lactic acid; monovalent or di- or higher valent salts of polycarboxylic acids such as phthalic acid, succinic acid, adipic acid, citric acid, and tartaric acid; and organic acid metal salts or organic ammonium salts such as sulfonic acid and amino acids of the above metal, can also be preferably used.

The amount of the electrolyte in the hydrogel is preferably 0.05 mass % to 10 mass %, more preferably 0.1 mass % to 6 mass % to impart electrical conductivity to the hydrogel. When the amount is overly low, impedance of the hydrogel becomes higher and electrical conductivity becomes worse. As the amount of the electrolyte increases, impedance of the hydrogel decreases. However, when the amount of the electrolyte is overly high, impedance of the hydrogel no longer further decreases, and it is not preferable from the viewpoint of cost.

A base such as sodium hydroxide can be added to the hydrogel as appropriate in order to adjust the pH.

Furthermore, for the purpose of enhancing the adhesive force of the hydrogel, the hydrogel may include an amphiphilic polymer such as polyacrylic acid or a salt thereof, as required. Examples of such amphiphilic polymers include a copolymer of acrylic acid and methacrylic acid, and a polymer including N-alkyl sulfonic acid acrylamide in the structural unit. These amphiphilic polymers may be used alone, or in combination.

The hydrogel may include other additives such as a rust-proofing agent, an antifungal agent, an antioxidant, an antifoaming agent, a stabilizer, a surfactant, a colorant, and the like.

Intermediate Substrates

The hydrogel sheet of the embodiment of the invention includes a first intermediate substrate and a second intermediate substrate placed or embedded in the hydrogel. The stretch rate of the first intermediate substrate is 20% to 90%. The second intermediate substrate satisfies the condition of either (i) the stretch rate is 100% to 200%; or (ii) the stretch rate is 20% to 90°/a and the maximum load at the time of being fractured is 5N to 15N.

By satisfying the above conditions of the first-intermediate substrate and the second intermediate substrate, a hydrogel sheet that has excellent followability to an object and is excellent in handleability is provided. The object to which the hydrogel sheet is applied includes skin. The skin may be a bent portion of the skin, or a flat portion of the skin.

The material that forms the first intermediate substrate and the second intermediate substrate is not limited, as long as the respective intermediate substrates satisfy the above-mentioned conditions of the stretch rate and/or the maximum load at the time of being fractured. For example, the material may be a nonwoven fabric or a woven fabric. For the material of the nonwoven fabric or the woven fabric, natural fibers such as cellulose, silk, and hemp; synthetic fibers such as polyester, nylon, rayon, polyethylene, polypropylene, and polyurethane; or a blend thereof may be used. A binder may be used for the nonwoven fabric or the woven fabric, as required. The nonwoven fabric or the woven fabric may be colored, as required.

The method for producing the woven fabric may include, but is not particularly limited to, a plain weave, tricot weave, Russell weave, and the like. The method for producing the non-woven fabric may include, but is not particularly limited to, a dry process, a wet process, a spun-bonding method, a melt-blown method, an air-laid method, a chemical bonding method, a thermal bonding method, needle punch, stream confounding, and the like. The method can be selected as appropriate depending on the grammage and quality of the fabric.

The grammage of each of the woven fabric and the nonwoven fabric is not particularly limited, as long as it is of a scale that enables the fabric to have desired physical properties as an intermediate substrate. For example, the grammage is preferably 10 g/m$^2$ to 50 g/m$^2$, more preferably 10 g/m$^2$ to 40 g/m$^2$. The grammage of each of the woven fabric and the nonwoven fabric of 10 g/m$^2$ or higher is advantageous in terms of shape retention of the gel sheet, prevention of irregularities of grammage, and permeability of the liquid in manufacturing the gel sheet.

A grammage of each of the woven fabric and the nonwoven fabric of 50 g/m$^2$ or lower is advantageous in terms of prevention of excessive hardness of the intermediate substrate, and followability of the hydrogel to an object such as skin. The grammage of each of the woven fabric and the nonwoven fabric is determined as appropriate depending on these balances.

Preferably, the first intermediate substrate is a nonwoven fabric, and the second intermediate substrate is a woven fabric or a nonwoven fabric. In one preferred embodiment, the first intermediate substrate is a nonwoven fabric and the second intermediate substrate is a woven fabric. In another preferred embodiment, the first intermediate substrate is a nonwoven fabric, the second intermediate substrate is also a nonwoven fabric, and the first and the second intermediate substrates are the same nonwoven fabric. In yet another preferred embodiment, the first intermediate substrate is a nonwoven fabric and the second intermediate substrate is also nonwoven fabric, but the first and the second intermediate substrates are different nonwoven fabrics.

Since the stretch rate of the first intermediate substrate is 20% to 90%, it is not particularly high. The stretch rate of the second larger intermediate substrate is 100% to 200%, which is higher than the stretch rate of the first intermediate substrate. Alternatively, when the stretch rate of the second intermediate substrate is the same as or similar to the stretch rate of the first intermediate substrate, the maximum load of the second intermediate substrate at the time of being fractured is 5N to 15N. When the maximum load values at the time of being fractured is 5N to 15N, the intensity of the second intermediate substrate is small. Thus, the followability of the hydrogel sheet to an object is good.

A stretch rate of the first intermediate substrate of not less than 20% is preferred, since the shape retention and handleability (or usability) of the entire gel sheet are improved. A stretch rate of the first intermediate substrate exceeding 90% may impair the handleability of the hydrogel sheet due to over-stretching of the first intermediate substrate.

A stretch rate of the second intermediate substrate of not less than 20% is preferred, since the shape retention and handleability (or usability) of the entire gel sheet are improved. When the stretch rate of the first intermediate substrate is 20% to 90% and the stretch rate of the second intermediate substrate exceeds 90% and is less than 100%, the followability of the hydrogel sheet to the object is decreased. A stretch rate of the second intermediate substrate exceeding 200% may impair the handleability of the hydrogel sheet due to over-stretching of the second intermediate substrate.

Normally, a hydrogel sheet is place in such a way that the first intermediate substrate is placed on the side of an electrode, and the second intermediate substrate is placed on the side of an object such as skin. Thus, the hydrogel sheet can exhibit followability originating from the second intermediate substrate, as well as shape retention and handleability originating from the first intermediate substrate when the hydrogel sheet is released from the object.

The maximum load of the first intermediate substrate at the time of being fractured is not particularly limited, but is preferably 5N to 50N. It is desirable that the maximum load of the first intermediate substrate is 5N to 15N, and that the maximum load value of the second intermediate substrate at the time of being fractured is the same as or lower than that of the first intermediate substrate. A maximum load of the first intermediate substrate at the time of being fractured of 50N or less is preferred in that the intensity of the first intermediate substrate is not particularly high, and does not impair the effect of the followability of the second intermediate substrate to the object.

The maximum load of the second intermediate substrate at the time of being fractured when the stretch rate of the second intermediate substrate is 100% to 200% is not particularly limited. However, in terms of followability of the hydrogel sheet to the object and handleability of the hydrogel sheet, the maximum load of the second intermediate substrate is preferably higher than that of the first intermediate substrate. More preferably, the maximum load of the second intermediate substrate is 5N to 50N.

When the thickness of each of the first and second intermediate substrates is overly high, the permeability of the liquid into the intermediate substrates becomes worse; this may have a bad influence on the electrical conductivity of the gel sheet. When the thickness of each of the first and second intermediate substrates is overly low, the gel sheet cannot be reinforced as in the case when the grammage of each of the intermediate substrates is overly low. Additionally, there is a possibility that the location of the intermediate substrates may move. Thus, the thickness of each of the first and second intermediate substrates may be determined by taking these factors into consideration. The thickness of each of the first and second intermediate substrates is preferably in the range of 0.05 mm to 2.0 mm, more preferably 0.05 mm to 0.5 mm, and particularly preferably 0.08 mm to 0.3 mm.

Method of Producing a Hydrogel Sheet

A hydrogel may be produced by dispersing the materials that constitute the hydrogel other than water and a polymerization initiator in water, and crosslinking the dispersion liquid by heating or UV irradiation. The term dispersion not only includes the state in which a solute is not miscible with water but dispersed in water, but also dissolution in which a solute and water are miscible to each other to form a mixture of a uniform phase.

The polymerization initiator may be a thermal polymerization initiator or a photopolymerization initiator, and known thermal polymerization initiators or photopolymerization initiators for polymerizing acrylic monomers may be used. The amount of the polymerization initiator is not particularly limited, but is preferably not less than 0.01 mass % and not more than 1 mass % with respect a dispersion liquid that is a composition before polymerization and that does not include a polymerization initiator (also referred to as a blend solution of monomers). When the dispersion liquid is polymerized by ultraviolet irradiation, the integrated irradiance by ultraviolet is, for example, preferably in the range of 800 mJ/cm$^2$ to 10000 mJ/cm$^2$, more preferably in the range of 2000 mJ/cm² to 10000 mJ/cm²; however, this may vary depending on factors such as the amount of the polymerization initiator.

By setting the amount of the polymerization initiator and the ultraviolet irradiance, the reaction rate of acrylic monomers may be adjusted as appropriate. For example, the reaction rate may be set to 99.8% or higher. The ultraviolet irradiance is not particularly limited; however, an ultraviolet ray having a peak intensity of 70 mW/cm² to 150 mW/cm² may be irradiated. When the peak intensity is not less than 70 mW/cm², the amount of ingredients having a low molecular weight is increased, and adhesive function of the hydrogel is improved. When the peak intensity is not more than 150 mW/cm², ingredients having suitable molecular weights are easily produced.

The manufacturing process of the hydrogel sheet including the first and second intermediate substrates differs depending on detailed conditions such as the composition of the hydrogel, the material of each of the intermediate substrates, and the thickness of the sheet; is not particularly limited.

For example, in one method, the intermediate substrates are kept in air in a state in which a certain level of tension that causes the deformation of the intermediate substrates in the vertical direction to be minimized, or a greater tension than that, is applied to the intermediate substrate. Then, a blend solution of monomers is introduced on the upper and lower sides of each of the intermediate substrates. Next, the liquid is polymerized (e.g., by light irradiation) to form a sheet. In another method, two sheets, including constituents of the hydrogel, each having a flat surface are produced. Then, the intermediate substrates, which are kept in a state in which a certain level of tension or greater is applied, are sandwiched with the two sheets to form a composite. In yet another method, a sheet including constituents of the hydrogel having a flat surface is produced. Then, the intermediate substrates, which are kept in a state in which a certain level of tension or greater is applied, are disposed on the sheet. Then, the blend solution of monomers is applied on the intermediate substrates, and polymerized (e.g., by light irradiation). A suitable method therefor can be used.

The shape of the hydrogel sheet formed into a sheet can be any shape, depending on the purpose. For example, the sheet may generally be a rectangle or a circle. In the following, a hydrogel in sheet form is referred to as "a hydrogel sheet" or "a gel sheet."

Hydrogel Sheet

The hydrogel sheet of the embodiment of the present invention includes hydrogel, the first intermediate substrate, and the second intermediate substrate.

The first intermediate substrate and the second intermediate substrate are preferably embedded along the in-plane direction of the hydrogel sheet. As used herein, in-plane direction of the hydrogel sheet refers to any direction perpendicular to the thickness direction of the hydrogel sheet.

By placing the hydrogel sheet in such a manner that the first intermediate substrate is positioned on the side of an electrode and the second intermediate substrate is positioned on the side of an object to which the hydrogel sheet is applied, such as skin, the hydrogel sheet exhibits followability to the object and good handleability. Since the handleability is good, the hydrogel sheet is hard to deform even after it is adhered to and released from the object repeatedly. Thus, the hydrogel sheet can be used repeatedly, and exchange of hydrogel sheets is smooth. By incorporating the second intermediate substrate that has a higher stretch rate on the side of the object, ease of release of the hydrogel sheet is improved, and thus handleability of the hydrogel sheet is improved.

It is preferable that the first intermediate substrate is embedded along the in-plane direction of the hydrogel sheet between one surface of the hydrogel sheet and the middle of the hydrogel sheet in the thickness direction of the hydrogel sheet, and the second intermediate substrate is embedded along the in-plane direction of the hydrogel sheet between the other surface of the hydrogel sheet and the middle of the hydrogel sheet in the thickness direction of the hydrogel sheet.

When the two layers of the first intermediate substrate and the second intermediate substrate are positioned overly close, the effects of followability and handleability are reduced. For this reason, in preferred embodiments, when a hydrogel sheet is placed on a flat surface in such a manner that the second intermediate substrate is positioned lower than the first intermediate substrate, the lower face of the hydrogel sheet is regarded as a starting point of the height in the thickness direction and the upper face of the hydrogel sheet is regarded as an end point of the height in the thickness direction, the first intermediate substrate and the second intermediate substrate are located in the range of 20% to 90% in the thickness direction of the hydrogel and the ratio of the height $H_2$ of the second intermediate substrate in the thickness direction to the height $H_1$ of the first intermediate substrate in the thickness direction satisfies:

$$0.2 \leq H_2/H_1 \leq 0.4,$$

wherein the height $H_1$ of the first intermediate substrate in the thickness direction is the height of the middle point of the thickness of the first intermediate substrate, and the height $H_2$ of the second intermediate substrate in the thickness direction is the height of the middle point of the thickness of the second intermediate substrate.

When the thickness of the hydrogel sheet is overly thick, shear stress decreases. When the thickness of the hydrogel sheet is overly thin, cohesive force decreases. Thus, a suitable thickness of the hydrogel sheet is selected while taking these factors into consideration. Preferably, the thickness of the hydrogel sheet is 0.2 mm to 2.0 mm, more preferably 0.3 mm to 1.5 mm, even more preferably 0.5 mm to 1.5 mm.

The adhesive force of the hydrogel of the embodiment of the invention to a Bakelite plate is not particularly limited; however, the preferred lower limit is 1 N/20 mm, and the preferred upper limit is 15 N/20 mm. When the adhesive force is below the lower limit, the adhesive force of the hydrogel to the skin is insufficient, and there is a possibility that the hydrogel will drop off an element of the electrode even when the hydrogel is contacted with the electrode. When the adhesive force exceeds the upper limit, the adhesive force to the skin becomes overly strong, and there is a possibility that removal of the hydrogel will be accompanied by pain or flush. The lower limit of the adhesive force of the hydrogel to the Bakelite plate is preferably 2 N/20 mm, more preferably 3 N/20 mm. The upper limit of the adhesive force of the hydrogel to the Bakelite plate is preferably 9 N/20 mm, more preferably 7 N/20 mm.

Optionally, a base film may be provided on one face of the hydrogel sheet, and/or a top film may be provided on the other face (i.e., the back face of the face to which the base film is provided). Either or both of the base film and the top film may be provided.

The base film may be a resin film made of a resin such as polyester, polyolefin, or polystyrene; a paper; or a paper laminated with the resin film.

The face of the base film that contacts the gel sheet 1 preferably undergoes a releasing process. Examples of the releasing process include silicone coating. Bake-type silicone coating that is crosslinked and hardened by heating or ultraviolet rays is particularly preferred. The film to which the releasing process is conducted is preferably an oriented PET (polyethylene terephthalate) film, or an OPP (oriented polypropylene) film.

The same material as that for the base film may be used for the top film. However, when the top film is provided on the hydrogel and the hydrogel is polymerized from above the top film by UV irradiation, selection of a film made of a material that does not shield light is preferred in order to not prevent light polymerization.

By the above configuration, the hydrogel sheet of the embodiment of the invention is easily adhered to a bent surface, distorted less at the time of releasing from an object, and is easily handled.

Adhesive gel sheets comprising a hydrogel have been preferably used as surgical tapes for application to a living body, as tapes for fixing various medical apparatus, as electrode pads for application to a living body, as electrodes for electrocardiogram, and as industrial adhesion tapes for a building material or an electronic material; and are required to have sufficient adhesion force to an object to which the gel sheet is applied. The reason therefor is that, for example, when the gel sheet is used for a human body for a long period of time, it is possible that the hydrogel will peel away from the end or fall off of the human body if the hydrogel cannot follow the stretch or bend of the skin. In recent years, health promotion devices have been developed for an aging society, and to increase healthy life expectancy. Elderly people have increasing opportunities to operate such devices by themselves, and apply the hydrogel by themselves.

The present invention encompasses an adhesive gel sheet, preferably an adhesive gel sheet comprising an adhesive hydrogel for a living body that is suitable for application or adhesion to a human body in the medical or health field. More preferably, the invention encompasses a gel sheet that is adhered to an electrode such as a stimulating electrode (e.g., a TENS (transcutaneous electrical nerve stimulation) electrode) for repeated use.

The hydrogel sheet of the embodiment of the invention is excellent in flexibility and water retention, and thus can be used in various fields such as medical, cosmetics, food, chemistry, civil engineering, agriculture, bioengineering, and sports. For example, the hydrogel sheet of the embodiment of the invention may be used as a surgical tape for application to a living body, as tapes for fixing various medical apparatus, as electrode pads for application to a living body, as electrodes for electrocardiograms, as gel for industrial adhesion tapes for a building material or an electronic material, as cosmetic face masks, and as cell culture mediums. Preferably, the hydrogel sheet of the embodiment of the invention may be used as a medical electrode hydrogel to be placed between an electrode formed from a conductive material and a skin surface.

Figure 2:
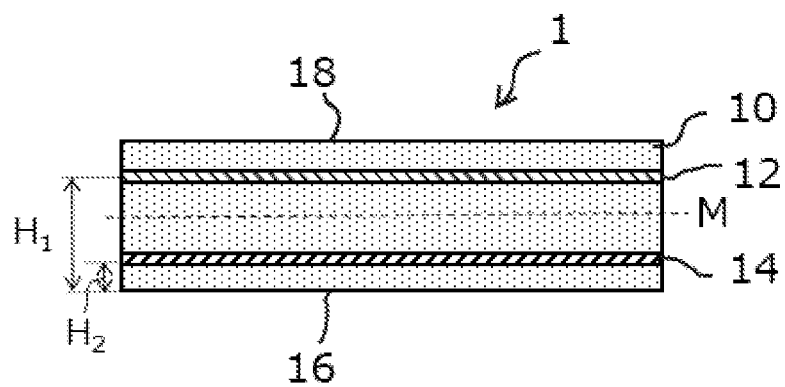
FIG. 2 is an schematic sectional view of the hydrogel sheet along the A-A line of FIG. 1.

FIG. 1 is a schematic plan view of an embodiment of the hydrogel sheet, and FIG. 2 is an schematic sectional view of the hydrogel sheet along the A-A line of FIG. 1. The hydrogel sheet 1 includes the hydrogel 10, and first intermediate substrate 12 and the second intermediate substrate 14 that are placed or embedded in the hydrogel 10. The details of the hydrogel 10, the first intermediate substrate 12, and the second intermediate substrate 14 have been described above.

The first intermediate substrate 12 has a stretch rate of 20% to 90%. The second intermediate substrate 14 satisfies the condition of either (i) the stretch rate is 100% to 200%; or (ii) the stretch rate is 20% to 90% and the maximum load at the time of being fractured is 5N to 15N.

The first intermediate substrate 12 is located on the upper side of the middle plane M in the height direction of the hydrogel 10, and the second intermediate substrate 14 is located on the lower side of the middle plane M.

When the lower face 16 of the hydrogel sheet 1 is regarded as a starting point of the height in the thickness direction and the upper face 18 of the hydrogel sheet 1 is regarded as an end point of the height in the thickness direction, the first intermediate substrate 12 and the second intermediate substrate 14 are located in the range of 20% to 90% in the thickness direction of the hydrogel, and the ratio of the height $H_2$ of the second intermediate substrate 14 in the thickness direction to the height $H_1$ of the first intermediate substrate 12 in the thickness direction satisfies:

$0.2 \leq H_2/H_1 \leq 0.4$.

The hydrogel sheet 1 having such configuration has excellent followability to the object, and excellent handleability.

Notwithstanding the appended claims, aspects of the present invention and exemplary embodiments are described below.

Item 1. A hydrogel sheet comprising a hydrogel and a plurality of intermediate substrates embedded in the hydrogel, the plurality of intermediate substrates including a first intermediate substrate and a second intermediate substrate, wherein the first intermediate substrate has a stretch rate of 20% to 90% measured by the following measurement method:

Measurement method: An intermediate substrate having a 20 mm-width and a 100-mm length is clamped at 70-mm intervals in the length direction, the intermediate substrate is stretched in the length direction at a stretch rate of 100 mm/min, and the length L (mm) of the intermediate substrate between the clamps when the maximum load was applied is measured. The stretch rate (%) is calculated as [(L-70)/70]*100, and the second intermediate substrate satisfies either (i) the stretch rate is 100% to 200%, or (ii) the stretch rate is 20% to 90% and the maximum load at the time of being fractured is 5N to 15N.

Item 2. The hydrogel sheet according to Item 1, wherein when a hydrogel sheet is placed on a flat surface in a manner such that the second intermediate substrate is positioned lower than the first intermediate substrate, the lower face of the hydrogel sheet is regarded as a starting point of the height in the thickness direction, and the upper face of the hydrogel sheet is regarded as an end point of the height in the thickness direction, the first intermediate substrate and the second intermediate substrate are located in the range of 20% to 90% in the thickness direction of the hydrogel sheet, and the ratio of the height $H_2$ of the second intermediate substrate in the thickness direction to the height $H_1$ of the first intermediate substrate in the thickness direction satisfies:

$0.2 \leq H_2/H_1 \leq 0.4$.

Item 3. The hydrogel sheet according to Item 1 or 2, wherein the hydrogel includes a polymer matrix, water, and polyhydric alcohol, and the polymer matrix includes a copolymer of an acrylic monomer and a crosslinkable monomer.

Item 4. The hydrogel sheet according to any one of Items 1 to 3, wherein the thickness of the hydrogel sheet is 0.5 mm to 1.5 mm.

Item 5. The hydrogel sheet according to any one of Items 1 to 4, wherein the first intermediate substrate is a nonwoven fabric, and the second intermediate substrate is a woven fabric or a nonwoven fabric.

Item 6. A medical electrode hydrogel used to be placed between an electrode formed from a conductive material and a skin surface, the hydrogel comprising a hydrogel sheet including a hydrogel and a plurality of intermediate substrates embedded in the hydrogel, the plurality of intermediate substrates including a first intermediate substrate and a second intermediate substrate, wherein the first intermediate substrate has a stretch rate of 20% to 90% measured by the following measurement method:

Measurement method: An intermediate substrate having a 20 mm-width and a 100-mm length is clamped at 70-mm intervals in the length direction, the intermediate substrate is stretched in the length direction at a stretch rate of 100 mm/min, and the length L (mm) of the intermediate substrate between the clamps when the maximum load was applied is measured. The stretch rate (%) is calculated as [(L-70)/70]*100, and the second intermediate substrate satisfies either (i) the stretch rate is 100% to 200%, or (ii) the stretch rate is 20% to 90% and the maximum load at the time of being fractured is 5N to 15N.

Item 7. The medical electrode hydrogel according to Item 6, wherein when a hydrogel sheet is placed on a flat surface in a manner such that the second intermediate substrate is positioned lower than the first intermediate substrate, the lower face of the hydrogel sheet is regarded as a starting point of the height in the thickness direction, and the upper face of the hydrogel sheet is regarded as an end point of the height in the thickness direction, the first intermediate substrate and the second intermediate substrate are located in the range of 20% to 90% in the thickness direction of the hydrogel sheet, and the ratio of the height $H_2$ of the second intermediate substrate in the thickness direction to the height $H_1$ of the first intermediate substrate in the thickness direction satisfies:

$0.2 \leq H_2/H_1 \leq 0.4$.

Item 8. The medical electrode hydrogel according to Item 6, wherein the hydrogel includes a polymer matrix, water, and polyhydric alcohol, and the polymer matrix includes a copolymer of an acrylic monomer and a crosslinkable monomer.

Item 9. The medical electrode hydrogel according to Item 6, wherein the thickness of the hydrogel sheet is 0.5 mm to 1.5 mm.

Item 10. The medical electrode hydrogel according to Item 6, wherein the first intermediate substrate is a nonwoven fabric, and the second intermediate substrate is a woven fabric or a nonwoven fabric.

EXAMPLES

Hereinbelow, the present invention will be described in more detail with reference to the Examples; however, these Examples should not be construed as limiting the present invention.

1. Manufacture of Hydrogel Sheets

Example 1

Production of a Blend Solution of Monomers

As shown in Table 1, 20 mass % of acrylamide as a non-crosslinkable monomer, 0.04 mass % of methylene bis-acrylamide as a crosslinkable monomer, and 18 mass % of ion exchange water are mixed, stirred, and uniformly dissolved using a stirrer in a mixing container. Then, 58.5 mass % of glycerine was added and stirred until the mixture became uniform. Next, 2.5 mass % of sodium chloride as an electrolyte and a total of 0.9 mass % of other additives of citric acid, sodium benzoate, a light polymerization initiator, and a surfactant were added to the mixture; and the mixture was stirred until these compounds were completely dissolved to yield a clear blend solution of the monomers.

Production of a Hydrogel Sheet

The resultant blend solution was applied dropwise on a PET film coated with silicone while passing through a certain clearance to spread the solution. Then, the intermediate substrate 1 was placed on the film. The solution was applied further onto the intermediate substrate 1 while passing through a certain clearance to spread the solution. Then, the intermediate substrate 2 was placed on the solution. The solution was applied dropwise further onto the intermediate substrate 2 while passing through a certain clearance. Then, a PET film coated with silicone was placed on the solution to spread the solution uniformly so that the thickness of the entire sheet became 1.0 mm. Ultraviolet rays were irradiated with an energy level of 3000 $mJ/cm^2$ using a metal halide lamp to obtain a hydrogel sheet having a thickness of 1.0 mm.

Examples 2 to 11

The hydrogel sheets of Examples 2 to 11 were produced in the same manner as in Example 1, except that the intermediate substrates used, the position of the intermediate substrates and the thickness of the hydrogel sheets were changed as shown in Table 1.

Example 12

The blend solution of monomers was prepared in the same manner as in Example 1, except that the mass % of each ingredient was changed as shown in Table 1. The hydrogel sheet was produced in the same manner as in Example 1.

Example 13

As shown in Table 1, 14.4 mass % of acrylic acid, 9.6 mass % of tert-butyl acrylamide sulfonic acid (TBAS) as non-crosslinkable monomers, and 0.04 mass % of methylene bis-acrylamide as a crosslinkable monomer were mixed, and 17.3 mass % of ion exchange water was mixed and stirred using a stirrer in a mixing container. Further, 8 mass % of NaOH (50 mass %) solution was added to adjust the pH of the mixture to pH 4 to 5, and stirred until the mixture became uniform. Then, 45 mass % of glycerine as a humidifier was added and stirred until the mixture became uniform. Next, 2.5 mass % of sodium chloride as an electrolyte, a total of 3.15 mass % other additives of citric acid, sodium benzoate, a light polymerization initiator, a surfactant, and N-vinyl-2-caprolactam were added to the mixture; and the mixture was stirred until these compounds were completely dissolved to yield a clear blend solution. Using this solution, the hydrogel sheet was produced in the same manner as in Example 1.

Comparative Examples 2 to 5

The hydrogel sheets of Comparative Examples 2 to 5 were produced in the same manner as in Example 1, except that the intermediate substrates and the position of the intermediate substrates were changed as shown in Table 1.

2. Characteristics of Hydrogel Sheets (1) Check of Positions of Intermediate Substrates The gel sheet was cut with a razor blade to a size of 50-mm width×20-mm length. The cross-sectioned surface of the cut piece was observed at three points, i.e., at the center and at both ends in the direction of 50-mm width, at 100× magnification with a microscope (VH—Z 100R, Keyence Corp.). The distance from the end of the hydrogel on the side of the PET film to the intermediate substrate was measured on the observed screen (corresponding to a 3-mm width), and the average value at the three points was calculated as the position of the intermediate substrate.

(2) Stretch Rate of the Intermediate Substrate

Each intermediate substrate was cut with a razor blade to produce a specimen having a 20-mm width×100-mm length. The specimen was clamped on the stretch test machine (Tensilon, Orientec Co., Ltd.; product name: RTE-1210) at 70-mm intervals in the length direction. The specimen was fixed at one side, and stretched in the length direction at a stretch rate of 100 mm/min. The length L (mm) of the intermediate substrate between the clamps when the maximum load was applied was measured. The average value in the two tests was calculated from the following expression, and defined as the stretch rate.

Stretch rate (%)=[($L$-70)/70]*100.

(3) Maximum Load at the Time of being Fractured of Intermediate Substrate

Each intermediate substrate was cut with a razor blade to produce a specimen having a 20-mm width×100-mm length. The specimen was clamped on the stretch test machine (Tensilon, Orientec Co., Ltd.; product name: RTE-1210) at 70-mm intervals in the length direction. The specimen was fixed at one side, and stretched in the length direction at a stretch rate of 100 mm/min. The load at the time the fracture occurred was measured as the maximum load. The average value in the two tests was calculated and defined as the maximum load at the time of being fractured.

3. Evaluation of Hydrogel Sheets (1) Evaluation of Adhesive Force

The hydrogel was cut out to a size of 120 mm×20 mm. The PET film was removed, and a Bakelite plate was contacted to the exposed gel surface and pressed together with a 2-kg press roller by moving it once in a reciprocal manner to obtain a test piece. A rheometer (CR-500DX; Sun Scientific Co., Ltd.) was used for the measurement. The measurement was carried out at an angle of 90 degrees and at a speed 300 mm/min, in accordance with JIS-Z0237 2009. The stress values at the predetermined points of removal distant from the starting point at certain distances (30, 40, 50, 60 or 70 mm) were measured, and the average values in the three tests (a total of 15 points) (N/20 mm) were calculated and defined as the adhesive force of the hydrogel. The measurement was carried out in an environment of 23±5° C. and 55%±10% humidity. The face of the hydrogel on the side of the intermediate substrate 1 was defined as the "electrode side," and the face of the hydrogel on the side of the intermediate substrate 2 was defined as the "skin side."

(2) Evaluation of Processability

To produce 16 sheets of specimens each having a size of 40 mm×40 mm, the specimens were punched out of the hydrogel sheet by cutting the hydrogel to the interface between the PET film and the hydrogel with a Thomson blade, without cutting the PET. The distance between the specimens was 8 mm. The unnecessary hydrogel of the marginal portion (or the frame portion) that surrounded the punched specimens was removed. For the specimens in which at least one specimen out of 16 specimens was also removed at the time of removing the marginal portion, and for the specimens in which the sectioned surfaces of the specimens became rough at the time of cutting with a Thomson blade, the processability was evaluated as B (Poor). For the specimens in which all of the 16 specimens neatly remained, the processability was evaluated as A (Good).

(3) Followability to a Bent Portion

Each hydrogel of Examples 1 to 13 and Comparative Examples 1 to 5 was cut to a specimen having a size of 120 mm×50 mm. The fifteen trained panelists adhered the specimen to their bent portions (elbow and tibia). When the hydrogel sheet did not detach from the bent portions even after 15 minutes, it was evaluated as S. When detachment occurred for one panelist, it was evaluated as A. When detachment occurred for two panelists, it was evaluated as B. When detachment occurred for three or more panelists, it was evaluated as C.

(4) Evaluation of Handleability

Each hydrogel sheet was cut to a size of 120 mm×20 mm. The exposed surface of the gel that appeared after the release of the PET film was adhered to the SUS plate, and pressed together with a 2-kg press roller by moving it once in a reciprocal manner to obtain a test piece. Then, the fifteen trained panelists released the hydrogel. When the gel was neatly released without being elongated, it was evaluated as A. When the gel was partly distorted but released neatly, it was evaluated as B. When the gel was elongated and could not neatly release, it was evaluated as C.

(5) Conductive Evaluation

Each hydrogel sheet was cut to a size of 20 mm×20 mm. The exposed surface of the gel that appeared after the release of the PET film was adhered to the SUS 304 plate. Another gel was cut in the same way, and the surface of the gel was exposed by releasing the PET film. Then, the two exposed gel surfaces were adhered together to obtain a specimen. This specimen was sandwiched with SUS plates, and the voltage applied between the SUS plates was measured under the conditions of input voltage: 10 V, frequency: 10 Hz, and resistance: 1 MΩ. The electrode impedance was calculated from the following expression (Ohm's law).

$$|Z|=E/I$$

wherein |Z| is an impedance (Ω) of an electrode, E is a value of voltage read with the oscilloscope, and I is a current 10 (μA) applied to the electrode.

TABLE 1

| | | Examples | | | | | | | | | | | | | Comparative Examples | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 | 4 | 5 |
| Composition rate (mass %) | Monomer Non-crosslinkable monomer (acrylamide) | 20 | 20 | 20 | 20 | 20 | 20 | 20 | 20 | 20 | 20 | 20 | 19 | — | 20 | 20 | 20 | 20 | 20 |
| | Non-crosslinkable monomer (acrylic acid) | — | — | — | — | — | — | — | — | — | — | — | — | 14.4 | — | — | — | — | — |
| | Non-crosslinkable monomer (TBAS) | — | — | — | — | — | — | — | — | — | — | — | — | 9.6 | — | — | — | — | — |
| | Crosslinkable monomer | 0.04 | 0.04 | 0.04 | 0.04 | 0.04 | 0.04 | 0.04 | 0.04 | 0.04 | 0.04 | 0.04 | 0.03 | 0.04 | 0.04 | 0.04 | 0.04 | 0.04 | 0.04 |
| | Water Ion exchange water | 18.0 | 18.0 | 18.0 | 18.0 | 18.0 | 18.0 | 18.0 | 18.0 | 18.0 | 18.0 | 18.0 | 28.0 | 17.3 | 18.0 | 18.0 | 18.0 | 18.0 | 18.0 |
| | Polyol Glycerin | 58.5 | 58.5 | 58.5 | 58.5 | 58.5 | 58.5 | 58.5 | 58.5 | 58.5 | 58.5 | 58.5 | 45.6 | 45.0 | 58.5 | 58.5 | 58.5 | 58.5 | 58.5 |
| | Electrolyte Sodium chloride | 2.5 | 2.5 | 2.5 | 2.5 | 2.5 | 2.5 | 2.5 | 2.5 | 2.5 | 2.5 | 2.5 | 5.6 | 2.5 | 2.5 | 2.5 | 2.5 | 2.5 | 2.5 |
| | 50% NaOH aq. | — | — | — | — | — | — | — | — | — | — | — | — | 8.0 | — | — | — | — | — |
| | Additives | 0.96 | 0.96 | 0.96 | 0.96 | 0.96 | 0.96 | 0.96 | 0.96 | 0.96 | 0.96 | 0.96 | 1.77 | 3.16 | 0.96 | 0.96 | 0.96 | 0.96 | 0.96 |
| Total | | 100 | 100 | 100 | 100 | 100 | 100 | 100 | 100 | 100 | 100 | 100 | 100 | 100 | 100 | 100 | 100 | 100 | 100 |
| Thickness (mm) | | 1.00 | 1.00 | 1.00 | 1.00 | 1.00 | 1.00 | 1.00 | 1.00 | 1.00 | 1.00 | 0.60 | 1.00 | 1.00 | 1.00 | 1.00 | 1.00 | 1.00 | 1.00 |
| Intermediate substrate | Intermediate substrate 1 | N | N | N | N | N | N | N | N | N | N | N | N | N | N | N | N | N | W |
| | Intermediate substrate 2 | W | W | W | W | W | W | W | W | N | N | W | W | W | — | — | — | N | W |
| Stretch rate of Intermediate substrate (%) | Intermediate substrate 1 | 35 | 40 | 82 | 35 | 35 | 35 | 35 | 35 | 35 | 35 | 35 | 35 | 35 | 35 | 35 | 95 | 35 | 160 |
| Maximum load at the time of fracture of Intermediate substrate (N) | Intermediate substrate 2 | 160 | 160 | 160 | 160 | 160 | 160 | 160 | 110 | 35 | 40 | 160 | 160 | 160 | — | — | — | 95 | 160 |
| | Intermediate substrate 1 | 7.1 | 11 | 40 | 7.1 | 7.1 | 7.1 | 7.1 | 7.1 | 7.1 | 7.1 | 7.1 | 7.1 | 7.1 | 7.1 | 7.1 | 48.0 | 7.1 | 33 |
| Intermediate substrate (N) | Intermediate substrate 2 | 33 | 33 | 33 | 33 | 33 | 33 | 33 | 39 | 7.1 | 11 | 33 | 33 | 33 | — | — | — | 48 | 33 |
| Grammage of Intermediate substrate (g/m2) | Intermediate substrate 1 | 13 | 25 | 40 | 13 | 13 | 13 | 13 | 13 | 13 | 13 | 13 | 13 | 13 | 13 | 13 | 68 | 13 | 15 |
| | Intermediate substrate 2 | 15 | 15 | 15 | 15 | 15 | 15 | 15 | 20 | 13 | 25 | 15 | 15 | 15 | — | — | — | 68 | 15 |
| Middle position | Intermediate substrate 1 (H1) | 0.9 | 0.9 | 0.9 | 0.7 | 0.6 | 0.6 | 0.9 | 0.9 | 0.9 | 0.9 | 0.54 | 0.9 | 0.9 | 0.9 | 0.5 | 0.9 | 0.9 | 0.9 |
| | Intermediate substrate 2 (H2) | 0.2 | 0.2 | 0.2 | 0.2 | 0.2 | 0.1 | 0.3 | 0.2 | 0.2 | 0.3 | 0.12 | 0.2 | 0.2 | — | — | — | 0.2 | 0.2 |
| | H2/H1 | 0.2 | 0.2 | 0.2 | 0.2 | 0.2 | 0.2 | 0.3 | 0.2 | 0.2 | 0.3 | 0.2 | 0.2 | 0.2 | 0.2 | 0.2 | 0.2 | 0.2 | 0.2 |
| Evaluation | Adhesive force to Bakelite (N/20 mm) Electrode side | 5.0 | 4.8 | 4.3 | 5.2 | 5.3 | 4.9 | 5.6 | 5.6 | 5.0 | 4.9 | 5.3 | 3.6 | 5.0 | 4.9 | 5.1 | 3.9 | 3.9 | 5.6 |
| | Skin side | 5.6 | 5.7 | 5.5 | 5.9 | 5.7 | 5.1 | 5.5 | 5.1 | 5.3 | 5.7 | 5.3 | 3.1 | 5.5 | 5.8 | 4.9 | 4.8 | 4.5 | 5.8 |
| | Processability | A | A | A | A | A | A | A | A | A | A | A | A | A | B | B | A | A | B |
| | Followability to bent | S | S | A | S | S | S | A | A | A | A | S | A | S | B | B | C | C | A |
| | Handling (ease of release) | A | A | A | A | A | A | A | A | A | A | A | A | A | B | B | A | A | C |
| | Electroconductivity (impedance Ω) 1 kHz | 68 | 68 | 76 | 65 | 68 | 69 | 65 | 65 | 70 | 69 | 71 | 29 | 50 | 65 | 67 | 72 | 79 | 71 |

* Codes of Intermediate substrates,
N: nonwoven fabric,
W = woven fabric.

What is claimed is:

1. A hydrogel sheet, comprising:
  a hydrogel, and
  a plurality of intermediate substrates embedded in the hydrogel, the plurality of intermediate substrates including a first intermediate substrate and a second intermediate substrate,
  wherein
  the first intermediate substrate is a nonwoven fabric, and the second intermediate substrate is a woven fabric,
  the first intermediate substrate has a stretch rate of 20% to 90% measured by the following measurement method:
    the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as $[(L-70)/70]*100$,
  wherein the second intermediate substrate has a stretch rate of 100% to 200%, the stretch rate of the second intermediate substrate being measured by the following measurement method:
    the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as $[(L-70)/70]*100$.

2. The hydrogel sheet according to claim 1,
  wherein when the hydrogel sheet is placed on a flat surface in a manner such that the second intermediate substrate is positioned lower than the first intermediate substrate, a lower face of the hydrogel sheet is regarded as a starting point of a height in the thickness direction, and an upper face of the hydrogel sheet is regarded as an end point of the height in the thickness direction, and
  wherein the first intermediate substrate and the second intermediate substrate are located in the range of 20% to 90% in the thickness direction of the hydrogel sheet, and a ratio of the height $H_2$ of the second intermediate substrate in the thickness direction to the height $H_1$ of the first intermediate substrate in the thickness direction satisfies: $0.2 \leq H_2/H_1 \leq 0.4$.

3. The hydrogel sheet according to claim 1, wherein the hydrogel includes a polymer matrix, water, and polyhydric alcohol, and the polymer matrix includes a copolymer of an acrylic monomer and a crosslinkable monomer.

4. The hydrogel sheet according to claim 1, wherein the thickness of the hydrogel sheet is 0.5 mm to 1.5 mm.

5. The hydrogel sheet according to claim 1,
  the first intermediate substrate has a stretch rate of 35% to 90%, the stretch rate of the first intermediate substrate being measured by the following measurement method:
    the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as $[(L-70)/70]*100$, and
  the second intermediate substrate has a stretch rate of 110% to 200%, the stretch rate of the second intermediate substrate being measured by the following measurement method:
    the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as $[(L-70)/70]*100$.

6. The hydrogel sheet according to claim 1,
  the first intermediate substrate has a stretch rate of 35% to 82%, the stretch rate of the first intermediate substrate being measured by the following measurement method:
    the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as $[(L-70)/70]*100$, and
  the second intermediate substrate has a stretch rate of 100% to 160%, the stretch rate of the second intermediate substrate being measured by the following measurement method:
    the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as $[(L-70)/70]*100$.

7. The hydrogel sheet according to claim 1,
  the first intermediate substrate has a stretch rate of 35% to 82%, the stretch rate of the first intermediate substrate being measured by the following measurement method:
    the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as $[(L-70)/70]*100$, and
  the second intermediate substrate has a stretch rate of 110% to 160%, the stretch rate of the second intermediate substrate being measured by the following measurement method:
    the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as $[(L-70)/70]*100$.

8. A medical electrode hydrogel used to be placed between an electrode formed from a conductive material and a skin surface, the hydrogel comprising:
  a hydrogel sheet including a hydrogel, and a plurality of intermediate substrates embedded in the hydrogel, the plurality of intermediate substrates including a first intermediate substrate and a second intermediate substrate, wherein the first intermediate substrate has a stretch rate of 20% to 90% measured by the following measurement method:

the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as [(L-70)/70]*100, wherein the second intermediate substrate has a stretch rate of 100% to 200%, the stretch rate of the second intermediate substrate being measured by the following measurement method:

the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as [(L-70)/70]*100.

9. The medical electrode hydrogel according to claim 8, wherein when the hydrogel sheet is placed on a flat surface in a manner such that the second intermediate substrate is positioned lower than the first intermediate substrate, a lower face of the hydrogel sheet is regarded as a starting point of a height in the thickness direction, and an upper face of the hydrogel sheet is regarded as an end point of the height in the thickness direction, and wherein the first intermediate substrate and the second intermediate substrate are located in the range of 20% to 90% in the thickness direction of the hydrogel sheet, and a ratio of the height $H_2$ of the second intermediate substrate in the thickness direction to the height $H_1$ of the first intermediate substrate in the thickness direction satisfies: $0.2 \leq H_2/H_1 \leq 0.4$.

10. The medical electrode hydrogel according to claim 8, wherein the hydrogel includes a polymer matrix, water, and polyhydric alcohol, and the polymer matrix includes a copolymer of an acrylic monomer and a crosslinkable monomer.

11. The medical electrode hydrogel according to claim 8, wherein the thickness of the hydrogel sheet is 0.5 mm to 1.5 mm.

12. The medical electrode hydrogel according to claim 8, wherein the first intermediate substrate is a nonwoven fabric, and the second intermediate substrate is a woven fabric.

13. The hydrogel sheet according to claim 8,
the first intermediate substrate has a stretch rate of 35% to 90%, the stretch rate of the first intermediate substrate being measured by the following measurement method:
the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as [(L-70)/70]*100, and
the second intermediate substrate has a stretch rate of 110% to 200%, the stretch rate of the second intermediate substrate being measured by the following measurement method:
the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as [(L-70)/70]*100.

14. The hydrogel sheet according to claim 8,
the first intermediate substrate has a stretch rate of 35% to 82%, the stretch rate of the first intermediate substrate being measured by the following measurement method:
the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as [(L-70)/70]*100, and
the second intermediate substrate has a stretch rate of 100% to 160%, the stretch rate of the second intermediate substrate being measured by the following measurement method:
the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as [(L-70)/70]*100.

15. The hydrogel sheet according to claim 8,
the first intermediate substrate has a stretch rate of 35% to 82%, the stretch rate of the first intermediate substrate being measured by the following measurement method:
the first intermediate substrate having a 20 mm-width and a 100-mm length is clamped at 70-mm intervals in a length direction, the first intermediate substrate is stretched in the length direction at a stretch rate of 100 mm/min, and the length L (mm) of the first intermediate substrate between the clamps when the maximum load is applied is measured, the stretch rate (%) is calculated as [(L-70)/70]*100, and
the second intermediate substrate has a stretch rate of 110% to 160%, the stretch rate of the second intermediate substrate being measured by the following measurement method:
the second intermediate substrate having a 20 mm-width and a 100-mm length is clamped at 70-mm intervals in a length direction, the second intermediate substrate is stretched in the length direction at a stretch rate of 100 mm/min, and the length L (mm) of the second intermediate substrate between the clamps when the maximum load is applied is measured, the stretch rate (%) is calculated as [(L-70)/70]*100.

* * * * *